United States Patent [19]

Boussely et al.

[11] Patent Number: 5,759,401
[45] Date of Patent: Jun. 2, 1998

[54] PROCESS FOR REMOVING PHOSPHATE FROM WASTE WATER

[75] Inventors: Jean-François Boussely, Saint Denis; Marin Dernat, Puteaux; Pierre Elmerich, Paris, all of France

[73] Assignee: Elf Atochem S.A., Puteaux, France

[21] Appl. No.: 589,318

[22] Filed: Jan. 22, 1996

[30] Foreign Application Priority Data

Jan. 20, 1995 [FR] France .................. 95 00640

[51] Int. Cl.$^6$ .................................................. C02F 3/30
[52] U.S. Cl. .................. 210/605; 210/630; 210/631; 210/727; 210/906
[58] Field of Search .................. 210/906, 605, 210/630, 631, 903, 726, 727

[56] References Cited

U.S. PATENT DOCUMENTS

| | | | |
|---|---|---|---|
| 3,423,309 | 1/1969 | Albertson | 210/906 |
| 4,017,388 | 4/1977 | Albertson | 210/906 |
| 4,416,779 | 11/1983 | Ripl et al. | 210/906 |
| 4,431,543 | 2/1984 | Matsuo et al. | 210/906 |
| 5,380,438 | 1/1995 | Nungesser | 210/906 |

FOREIGN PATENT DOCUMENTS

| | | |
|---|---|---|
| 0 497 114 | 8/1992 | European Pat. Off. . |
| 0 497 419 | 8/1992 | European Pat. Off. . |
| 16 58 079 | 5/1970 | Germany . |
| 288 367 | 10/1983 | Germany . |
| 2 103 504 | 2/1983 | United Kingdom . |

OTHER PUBLICATIONS

Abstract, Week 7644 (JP 50 075 562), Derwent Publications, Ltd., London, GB.

*Primary Examiner*—Thomas G. Wyse
*Attorney, Agent, or Firm*—Millen, White, Zelano, & Branigan, P.C.

[57] ABSTRACT

An improved process for removing phosphate from waste water comprising simultaneously injecting a coagulating agent upstream and downstream of a stage of biological oxidation in aerobic medium.

12 Claims, 2 Drawing Sheets

PROCESS FOR REMOVING PHOSPHATE FROM WASTE WATER

FIELD OF THE INVENTION

The present invention relates to a process for removing phosphorus from waste water.

The presence of Large amounts of phosphorus compounds, in particular orthophosphates, in sullage and other waste water is partially responsible for the phenomenon known as eutrophication.

The excessive abundance of phosphorus results in uncontrolled growth of algae and/or of plants which takes place in lakes and water courses and greatly modifies the biological and physico-chemical characteristics of these bodies of water, making it more difficult to carry out treatments aimed at bringing the water to drinking water quality.

In order to obtain phosphorus contents corresponding to current standards, municipal and/or industrial waste water discharged into the said media must be made the subject of specific treatments commonly known as phosphate removal.

Phosphorus is most often removed from the said waste water by a biological treatment or else by a physico-chemical treatment or alternatively by a combination of these two treatments.

Biological phosphate removal is based on the alternation of aerobic/anaerobic sequences in order to modify the enzymatic balance which regulates the synthesis of polyphosphates by microorganisms. Phosphorus is thus accumulated in solid matter.

In order for conditions to be favourable for biological phosphate removal, it is necessary to have a significant input of biodegradable organic loads.

The COD (Chemical Oxygen Demand) is an important parameter with respect to the NTK (total organic and ammoniacal nitrogen).

The COD/NTK ratio must be at least equal to 7.5, if complete denitrification is desired, in order not to disturb the phosphate removal. The higher the COD/P ratio, the better the removal.

This process has many advantages. In particular, it does not require the addition of a supplementary reactant. It produces little additional sludge and results in partial removal of the nitrogen.

However, it exhibits the disadvantage of having a phosphorus removal yield which depends on the external temperature, on the COD load and on the regularity of the flows. In the majority of cases, the yield does not exceed 60%.

Physico-chemical phosphate removal consists in removing phosphorus with ions of metals such as iron or aluminium.

This treatment constitutes the whole process of a conventional biological treatment plant or complements a biological phosphate removal.

In the case of the conventional treatment of municipal waste water, a plant can comprise various treatments which are justified according to the composition of the water to be treated and the objectives set by legislation.

It is possible generally to encounter mechanical treatments such as screening, degritting or oil separation; a stage of primary sedimentation; a stage of biological phosphate removal; a stage of aeration in a tank known as an "activated sludge" tank and a secondary sedimentation.

The "activated sludges" are generally composed of microorganisms and bacteria which, in aerobic medium, destroy carbonaceous pollution.

The performance of this plant can be improved by tertiary treatments such as filtration and/or disinfection.

In the absence of coagulants, primary sedimentation makes it possible to remove between 5 and 15% of phosphorus. It essentially concerns particulate phosphorus which precipitates naturally at this stage. The presence of this particulate phosphorus depends on factors such as the calcium-hardness (precipitation of $Ca_3(PO_4)_2$), the pH, the temperature, the concentration, the nature of the phosphorus, and the like.

During removal of the organic load, growth of the bacterial organisms of which the activated sludges are composed requires the presence of essential inorganic elements such as nitrogen (7 to 10%) and phosphorus (2 to 3%). In general, a phosphorus consumption of one gram per 100 grams of $BOD_5$ (biological oxygen demand after incubating for 5 days) removed is retained.

Biological phosphate removal occurs when the activated sludges are deprived of aeration for a certain period of time. Release of phosphorus into the liquid phase during the period of anaerobiosis and then "hyperabsorption" by the sludges when they are re-aerated are successively observed. The phosphorus content in the sludge can reach 6.5% or indeed 7% with respect to the dry matter. Biological phosphate removal requires a not insignificant carbon source and it is for this reason that, in waste water, the total phosphorus removal yield is between 40% and 70%.

This yield is highly unsatisfactory and this way of operating consequently does not make it possible to achieve the objective set by various legislative constraints which recommend increasingly low phosphorus contents in discharges. In particular, EEC directive 91/271 of 21 May 1991 and the French decree of 3 Jun. 1994 recommend a phosphorus removal yield of greater than 80% and a residual phosphorus content of less than 1 mg/l.

In order to complete the biological removal of phosphorus in waste water, use is additionally made of the coagulation reactants, commonly denoted by coagulants, based on metal salts of iron and/or of aluminium or on salts of alkaline-earth metals.

For treatment plants known as biological treatment plants, the performance of the physico-chemical phosphate removal is closely related to the choice of the injection point for the said coagulants.

Thus, the injection of the coagulants into the primary sedimentation tank (preprecipitation) makes it possible to remove approximately 80% of the phosphorus and, additionally, eases the pressure on the biological treatment. However, it is difficult to control the concentration of reactant and, in many cases, it is necessary to overdose, which has the disadvantage of increasing the volume of the sludges and can disturb the biological treatment.

The injection of the coagulants after the clarification (after-precipitation or tertiary treatment) make it possible to achieve savings as regards the amount of reactant. In this case, it is necessary to remove the precipitated phosphate by a tertiary clarification. This way of operating results in a significant investment which is prohibitory for the expansion of a large-capacity plant.

The injection of the coagulants into the aeration tank (coprecipitation), although constituting the best investment/consumption of coagulants compromise, does not make it possible, however, to comply with the values of EEC directive 91/271 of 21 May 1991 and of the French decree of 3 Jun. 1994.

SUMMARY OF INVENTION

A process for removing phosphate from waste water comprising the successive stages of mechanical pretreatments (1), of biological oxidation in aerobic medium (2) and of clarification (3) has now been found, characterized in that at least one coagulating agent is simultaneously injected upstream and downstream of the stage of biological oxidation in aerobic medium (2).

The process according to the present invention can furthermore contain additional stages such as a stage of primary sedimentation (4) and a stage of biological phosphate removal in anaerobic medium (5).

The stage of primary sedimentation generally comes after the stage of mechanical pretreatments (1) and before the stage of biological phosphate removal (5), the latter coming before the stage of biological oxidation (2).

In these configurations, the upstream injection of coagulant comes after the stage of primary sedimentation (4) and/or the stage of biological phosphate removal (5).

BRIEF DESCRIPTION OF DRAWINGS

FIGS. (1) to (4) displayed in Plate Sheet 1 represent possible and non-limiting configurations of the process according to the invention.

DETAILED DESCRIPTION OF DRAWINGS

Figure 1:
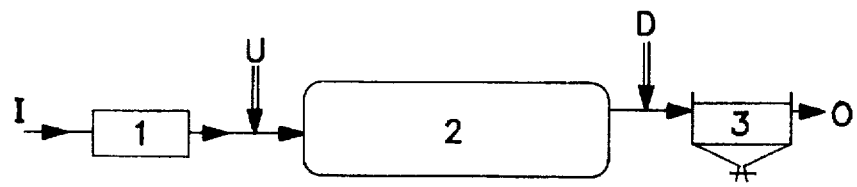
Figure 2:
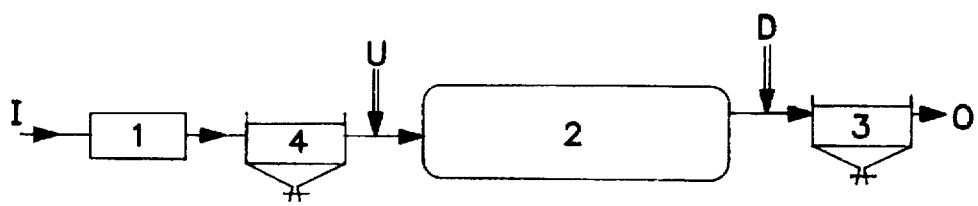
Figure 3:
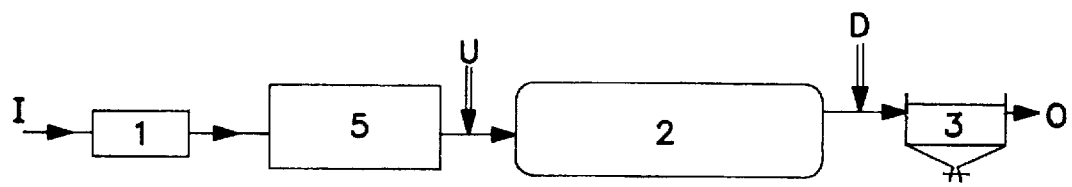
Figure 4:
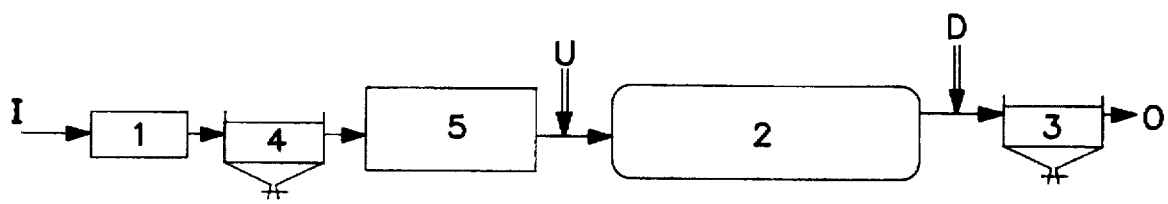

In FIGS. 1–4, (1) represents the stage of mechanical pretreatments, (2) the stage of biological oxidation in aerobic medium, (3) the stage of clarification, (4) the stage of primary sedimentation and (5) the stage of biological phosphate removal in anaerobic medium, the arrow→indicates the coagulant injection points, the letter (U) denotes the injection carried out upstream of (2), the letter (D) denotes the injection carried out downstream of (2), the letter (I) denotes the input of the raw water to be treated and the letter (O) denotes the output of the treated water.

According to the present invention, the stage of mechanical pretreatments (1) can comprise various operations such as screening, degritting, oil separation, and the like.

The coagulating agents which can be used according to the present invention are chosen from metal salts of iron and/or of aluminium or salts of alkaline-earth metals.

Mention will be made, by way of illustration of such salts, of ferric chloride $FeCl_3$; ferric sulphate; aluminium sulphate $Al_2(SO_4)_3 \cdot H_2O$; aluminium chloride $AlCl_3$; aluminium chlorohydrates of general formula: $Al_n(OH)_mCl_{3n-m}$, in which n is any number and 3n–m is positive, m and n being positive integers, it being possible for the said aluminium chlorohydrate additionally to contain a polyvalent anion Y chosen from the anions of sulphuric, phosphoric, polyphosphoric, silicic, carboxylic and sulphuric acids, the Y/Al molar ratio preferably being between 0.015 and 0.4; mixed iron chlorides, mixed polychlorides of iron and aluminium, iron chlorosulphates and calcium chloride.

According to the present invention, it is possible to use a mixture of at least two of the abovementioned metal salts.

It would not be departing from the context of the invention if organic polymers such as polyacrylamides were added to the abovementioned metal salts.

The invention applies very particularly to the use of aluminium chloride $AlCl_3$.

According to the present invention, the coagulating agent is generally injected in the form of an aqueous solution.

The percentage by weight of coagulating agent respectively and simultaneously introduced upstream and downstream of the stage of biological oxidation (2) is, for the upstream injection, between 90% and 10% and preferably between 80% and 20% of the total amount to be injected and, for the downstream injection, between 10% and 90% and preferably between 20% and 80% of the total amount to be injected.

The Me/Phosphorus to be removed (hereinafter Me/P) molar ratio, in which Me denotes the metal (metals) of the salt(s) used as coagulating agent, can either vary with the level of phosphorus in the raw water or remain constant when the introduction of the coagulant is subject to the level of phosphorus. It is generally between 0.1 and 1.5 and preferably between 0.2 and 0.8. A low value for this ratio reflects a low consumption of coagulating agent.

The process according to the present invention makes it possible in particular to obtain a phosphorus content in the treated water of less than 1 mg/l.

In the course of time, a regularity in this phosphorus content in the treatment plant output water is also observed. Indeed, very rarely are "peaks" greater than 1 mg/l observed. A contribution is thus made to the reliability of the plant for removing phosphate from waste water.

Moreover, for an identical Me/P molar ratio, it is observed that the process according to the present invention, a process which can be denoted as a double injection process, makes it possible to obtain a percentage of removal of phosphorus which is high and greater than any so-called monoinjection process.

This percentage of removal of phosphorus reaches 90% or indeed 95% and more.

This has the advantage of making it possible to decrease the amounts of coagulant to be used and, consequently, results in a decrease in the volume of the sludges.

The following example illustrates the invention.

EXAMPLE

The tests hereinbelow were carried out in a biological treatment plant having a treatment capacity of 100.000 eq/inhabitant and exhibiting the configuration of FIG. (3) in Plate 1.

In this treatment plant, the waste water is subjected to a stage of mechanical pretreatments (1) (degritting, screening, oil separation) and is then conveyed to a tank, known as an "anaerobic" tank, in which the stage of biological phosphate removal (5) is carried out. Anaerobic digestion is characterized by a specific bacterial activity which grows in the absence of oxygen and at a temperature in the region of 25° C.

The water is then introduced into a tank, known as an "aerobic" tank, in which the stage of biological oxidation (2) is carried out.

This tank is known as the "activated sludge" tank.

The effluent is then conveyed to clarifiers in order to undergo therein the stage of clarification (3).

The effluent is separated, in the clarifiers, from these suspended sludges.

The supernatant water constitutes the treatment plant output water (O). The settled sludges are taken up again and conveyed to a thickener (not shown in FIG. (3), in which a maximum amount of water is extracted, it being possible for the water to be recycled. The thickened sludges are dewatered and then made use of profitably, in particular in agriculture. The designations below are subsequently used:

Anaerobic injection: the injection (U) of coagulating agent carried out upstream of the "aerobic" tank where the stage of biological oxidation (2) is carried out, Aerobic injection: the injection (D) of coagulating agent carried out downstream of the "aerobic" tank where the stage of biological oxidation (2) is carried out, and Double injection, the simultaneous injection of coagulating agent carried out upstream (U) and downstream (D) of the said "aerobic" tank where the stage of biological oxidation (2) is carried out.

Test Conditions

Use is made, as coagulating agent, of an aqueous solution of aluminium chloride $AlCl_3$ having an $AlCl_3$ content by weight equal to 26%.

The amounts of coagulating agent introduced will subsequently be expressed as grams of the 26% aqueous $AlCl_3$ solution per $m^3$ of water to be treated. The tests for removal of phosphorus took place during the following three successive periods:

- during a first period of tests (A) of 30 days, a single injection of an aqueous $AlCl_3$ solution was carried out at the outlet of the anaerobic tank, upstream of (2), which injection is known as "anaerobic injection",
- during a second period of tests (B) of 23 days, two simultaneous injections of an aqueous $AlCl_3$ solution were carried out; the upstream injection (U) represents 80% by weight and the downstream injection (D) represents 20% by weight of the total amount injected; these injections are denoted "double injection",
- during a third period of tests (C) of 38 days, a single injection of an aqueous $AlCl_3$ solution was carried out at the outlet of the aerobic tank, that is to say downstream of (2); which injection is known as "aerobic injection".

During these three periods (A), (B) and (C), the amounts of the aqueous $AlCl_3$ solution injected are the following:

for the period (A): 63 $g/m^3$, for the period (B): 63 $g/m^3$ distributed as below:
- 49 $g/m^3$ for the anaerobic injection (U), i.e. 80% of the total amount,
- 14 $g/m^3$ for the aerobic injection (D), i.e. 20% of the total amount, for the period (C): 52 $g/m^3$.

Analyses

Analyses of the phosphorus were carried out on the raw water (I) and on the output water (O) of the treatment plant.

In addition to the total determination of the phosphorus, the following parameters were monitored:

the pH, the suspended matter (SM) and, the chemical oxygen demand (COD).

The analyses were carried out on average daily samples. The characteristics of the raw water to be treated (I) entering the treatment plant in FIG. (3) are displayed in Table 1.

TABLE 1

| Injection Nature (Period) | COD (mg/l) | | | Total phosphorus (mg/l) | | | pH | | | SM (mg/l) | | |
|---|---|---|---|---|---|---|---|---|---|---|---|---|
| | mean | minimum | maximum | mean | minimum | maximum | mean | minimum | maximum | mean | minimum | maximum |
| Anaerobic Injection (Period A) | 537 | 153 | 1066 | 11.13 | 6.04 | 19.4 | 7.64 | 7.05 | 8.21 | 412 | 295 | 588 |
| Double Injection (Period B) | 576 | 283 | 921 | 10.7 | 6.18 | 15.36 | 7.85 | 7.52 | 8.10 | 391 | 234 | 808 |
| Aerobic Injection (Period C) | 699 | 363 | 1502 | 11.56 | 7.16 | 16.02 | — | — | — | 328 | 187 | 490 |

It is observed that the differences between the maximum and minimum values of the total phosphorus content are large. However, the mean values of the three periods are very similar as regards the COD and the SM values. In contrast, if the means between each period are compared, the differences are low. As regards the pH, little difference is observed between the periods. In contrast, the difference is relatively large between the minima and the maxima for each period.

The phosphorus content in the raw water to be treated entering the treatment plant and in the treatment plant output water (O) treated according to the double injection process of the present invention and according to an anaerobic monoinjection process and an aerobic monoinjection process has been displayed in Table 2.

TABLE 2

| Nature of the injection (Period) | PHOSPHORUS CONTENT (mg/l) | | | | | |
|---|---|---|---|---|---|---|
| | RAW WATER | | | OUTPUT WATER | | |
| | mean | minimum | maximum | mean | minimum | maximum |
| Anaerobic Injection (Period A) | 11.13 | 6.04 | 19.4 | 1.43 | 0.46 | 4.46 |
| Double Injection (Period B) | 10.7 | 6.18 | 15.36 | 0.79 | 0.16 | 1.54 |

TABLE 2-continued

| Nature of the injection (Period) | PHOSPHORUS CONTENT (mg/l) | | | | | |
|---|---|---|---|---|---|---|
| | RAW WATER | | | OUTPUT WATER | | |
| | Value | | | | | |
| | mean | minimum | maximum | mean | minimum | maximum |
| Aerobic Injection (Period C) | 11.56 | 7.16 | 16.02 | 1.34 | 0.16 | 3.92 |

It is observed that the double injection, the simultaneous injection of coagulant upstream and downstream of (2), makes it possible to obtain a residual phosphorus content which is much less than 1 mg/l.

Figure 5:
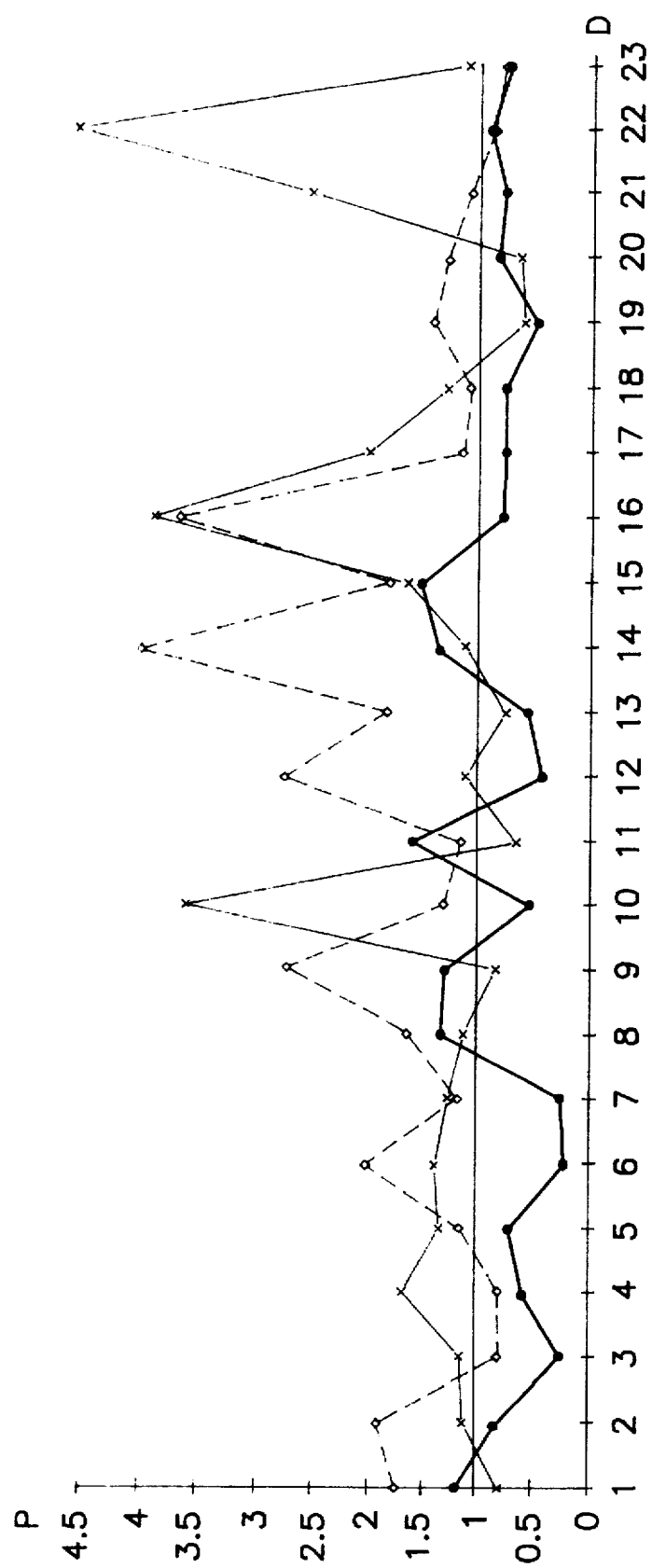
FIG. 5 is a graph of daily output levels of phosphorous from a treatment plant according to the invention.

Moreover, the results are much more regular and the residual phosphorus "peaks" are much lower. This is given visual form in the single graph of FIG. 5 which represents the daily output phosphorus level of the treatment plant.

In this graph, P denotes the output phosphorus content in mg/l of the treatment plant, D the number of days for each period, ✕ represents the anaerobic injection (Period A), ● represents the double injection (Period B) and - - - - - ◊ - - - - - represents the aerobic injection (Period C).

The Al/P molar ratio and the phosphorus removal yield for a monoinjection process: anaerobic injection, and for the process according to the present invention: double injection, have been displayed in Table 3.

TABLE 3

| Nature of the injection (Period) | Phosphorus removal yield (%) | | | Al/P Molar Ratio | | |
|---|---|---|---|---|---|---|
| | Value | | | | | |
| | Mean | Minimum | Maximum | Mean | Minimum | Maximum |
| Anaerobic Injection (Period A) | 87 | 77 | 92 | 0.36 | 0.21 | 0.46 |
| Double Injection (Period B) | 93 | 90 | 97 | 0.36 | 0.17 | 0.76 |

It is observed that, for the same Al/P molar ratio, which is equal to 0.36, a high phosphorus removal yield is obtained with the double-injection process according to the present invention. This yield is equal to 93% and is much greater than the yield of 87% obtained with the anaerobic monoinjection process.

The chemical oxygen demand (COD) and the suspended matter content (SM) for the raw water to be treated entering the treatment plant and for the treatment plant output water treated according to the double-injection process of the present invention and according to the anaerobic and aerobic monoinjection processes have respectively been displayed in Tables 4 and 5.

TABLE 4

| Nature of the injection (Period) | Chemical Oxygen Demand (mg/l) | | | | | |
|---|---|---|---|---|---|---|
| | RAW WATER | | | OUTPUT WATER | | |
| | Value | | | | | |
| | Mean | Minimum | Maximum | Mean | Minimum | Maximum |
| Anaerobic Injection (Period A) | 537 | 153 | 1066 | 37 | 10 | 69 |
| Double Injection (Period B) | 576 | 283 | 921 | 28 | 6 | 52 |
| Aerobic Injection (Period C) | 699 | 363 | 1502 | 27 | 12 | 46 |

A reduction in the COD (Table 4) between the aerobic injection and the double injection is not observed. In contrast, poorer results are observed in the case of the anaerobic injection.

TABLE 5

| Nature of the injection (Period) | Suspended MAtter (mg/l) | | | | | |
|---|---|---|---|---|---|---|
| | RAW WATER | | | OUTPUT WATER | | |
| | Value | | | | | |
| | Mean | Minimum | Maximum | Mean | Minimum | Maximum |
| Anaerobic Injection (Period A) | 421 | 295 | 588 | 21 | 6 | 51 |
| Double Injection (Period B) | 391 | 234 | 808 | 5 | 2 | 16 |
| Aerobic Injection (Period C) | 328 | 187 | 490 | 12 | 4 | 27 |

The double injection makes it possible to obtain a very low SM content (Table 5).

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosure of all applications, patents and publications, cited above and below, and of corresponding French application 94/00640, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

We claim:

1. In a process for removing phosphate from waste water comprising the successive stages of mechanical pretreatments of biological oxidation in aerobic medium and of clarification the improvement wherein at least one coagulating agent is simultaneously injected immediately upstream and immediately downstream of the stage of biological oxidation in aerobic medium.

2. A process according to claim 1, further comprising a stage of biological phosphate removal in an anaerobic medium upstream of the upstream injection of the at least one coagulating agent.

3. A process according to claim 2, further comprising a stage of primary sedimentation (4) downstream of the stage of mechanical pretreatments and upstream of the stage of biological phosphate removal in the anaerobic medium.

4. A process according to claim 2, wherein the upstream injection of coagulate is conducted downstream of at least one of the stage of primary sedimentation and the stage of biological phosphate removal in anaerobic medium.

5. A process according to claim 1, wherein the coagulating agent is at least one metal salt of a cation selected from the group consisting of iron, aluminum and an alkaline-earth metal.

6. A process according to claim 5, wherein the coagulating agent is at least one of ferric chloride, ferric sulphate, aluminum chloride, aluminum sulphate, an aluminum chlorohydrate, a mixed polychloride of iron and of aluminum, a mixed iron chloride and calcium chloride.

7. A process according to claim 6, wherein the coagulating agent is aluminum chloride $AlCl_3$.

8. A process according to claim 5, wherein the coagulating agent is in the form of an aqueous solution.

9. A process according to claim 1, wherein the percentage by weight of coagulating agent respectively and simultaneously introduced upstream and downstream of the stage of biological oxidation (2) is, for the upstream injection, between 90% and 10% of the total amount to be injected and, for the downstream injection, between 10% and 90% of the total amount to be injected.

10. A process according to claim 5 wherein the Me/P molar ratio, in which Me represents the metal of the metal salt and P the phosphorus to be removed, is between 0.1 and 1.5.

11. A process according to claim 9, wherein both of the percentages are between 20% and 80%.

12. A process according to claim 10, wherein the Me/P molar ratio is between 0.2 and 0.8.

* * * * *